United States Patent
Khanna et al.

(10) Patent No.: US 7,805,346 B1
(45) Date of Patent: Sep. 28, 2010

(54) SECURITIZATION STRUCTURE

(75) Inventors: Sanjeev Khanna, Allendale, NJ (US);
Charles N. Atkins, New York, NY (US);
J. Douglas Van Ness, Greenwich, CT (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 11/807,721

(22) Filed: May 30, 2007

(51) Int. Cl.
*G06Q 40/00* (2006.01)
(52) U.S. Cl. .......................... 705/35; 705/36 R; 705/38
(58) Field of Classification Search .................. 705/35, 705/36, 38
See application file for complete search history.

(56) References Cited

U.S. PATENT DOCUMENTS

| | | | |
|---|---|---|---|
| 6,999,942 B2 * | 2/2006 | Kemper et al. ................. | 705/38 |
| 7,089,503 B1 * | 8/2006 | Bloomquist et al. ......... | 715/780 |
| 2003/0074306 A1 * | 4/2003 | Rios et al. ..................... | 705/38 |
| 2003/0187777 A1 * | 10/2003 | Kochansky et al. ........... | 705/37 |
| 2004/0103056 A1 * | 5/2004 | Ikeda et al. ................... | 705/38 |
| 2004/0205021 A1 * | 10/2004 | Cahill et al. .................. | 705/38 |
| 2006/0020530 A1 * | 1/2006 | Hsu et al. ..................... | 705/35 |
| 2006/0064366 A1 * | 3/2006 | Smith ........................... | 705/35 |
| 2006/0074794 A1 * | 4/2006 | Nespola, Jr. ................. | 705/38 |
| 2006/0282356 A1 * | 12/2006 | Andres et al. ................. | 705/35 |
| 2006/0293985 A1 * | 12/2006 | Lederman et al. ............. | 705/35 |
| 2008/0005016 A1 * | 1/2008 | Uhlmann et al. .............. | 705/38 |
| 2008/0091581 A1 * | 4/2008 | Kremen ....................... | 705/35 |
| 2008/0109347 A1 * | 5/2008 | Pilcher et al. ................. | 705/38 |

OTHER PUBLICATIONS

Commercial Mortgage-Backed Securities (CMBS) Commercial Mortgage Securities Association (CMSA) updated: Mar. 2006.*
Interest Only Loan Refinance By Eric Morris Article Submitted on: Feb. 3, 2006.*
Securities Activities of Banks by Melanie L. Fein Published 2000.*
Interest Only Loan Refinance By Eric Morris http://ezinearticles.com/?Interest-Only-Loan-Refinance&id=139063&opt=print.*
Glossary of Terms Commercial Mortgage-Backed Securities (CMBS) Commercial Mortgage Securities Association (CMSA), 30 Broad Street, 28th Floor New York, NY 10004-2304 Web Site: cmbs.org, Phone (212) 509-1844, FAX: (212) 509-1895, Updated Mar. 2006, 2007 CMSA—Commercial Mortgage Securities Association, all rights reserved.*

(Continued)

*Primary Examiner*—Kambiz Abdi
*Assistant Examiner*—William E Rankins
(74) *Attorney, Agent, or Firm*—K & L Gates LLP

(57) ABSTRACT

A method comprising issuing, buying and/or selling pass-through certificates issued by an issuer. The pass-though rate payments on the certificates may be funded by payments to the issuer by one or more borrowers on a mortgage loan. The certificates may have a legal maturity and an expected maturity that is before the legal maturity. The payments owed by the borrowers on the mortgage loan may be interest only until the expected maturity. The one or more borrowers have a revolving credit facility with a liquidity provider, pursuant to which the liquidity provider commits to make advances to the one or more borrowers from time to time as necessary in order for the one or more borrowers to make timely payments of interest on the mortgage. The mortgaged property may comprise timberlands.

16 Claims, 4 Drawing Sheets

OTHER PUBLICATIONS

Understanding the commercial mortgagebacked securities market in the hospitality sector Phillip Gordon, Daniel Marre, Bruce Bonjour. Journal of Retail & Leisure Property. London: Mar. 2005. vol. 4, Iss. 2; p. 105.*

Synthetic leases: Structured finance, financial accounting and tax ownership Donald J Weidner. Journal of Corporation Law. Iowa City: Spring 2000. vol. 25, Iss. 3; p. 445, 43 pgs.*

Structured Finance (timberland securitization) Apr. 2004 The most recent version of this criteria is available at www.standardandpoors.com/ratings/structuredfinance Legal Criteria for U.S. Structured Finance Transactions.*

Fitch Downgrades CSFB, Series 2002-TFL1 Business Wire. New York: Mar. 17, 2005. p. 1.*

Synthetic leases: Structured finance, financial accounting and tax ownership Donald J Weidner. Journal of Corporation Law. Iowa City: Spring 2000. vol. 25, Iss. 3; p. 445, 43 pgs.*

Structured Finance Apr. 2004 Legal Criteria for U.S. Structured Finance Transactions.*

Understanding the commercial mortgagebacked securities market in the hospitality sector Phillip Gordon, Daniel Marre, Bruce Bonjour. Journal of Retail & Leisure Property. London: Mar 2005. vol. 4, Iss. 2; p. 105, 13.*

U.S. Appl. No. 11/374,860, filed Mar. 14, 2006.

Richard N. Smith, "Timberland market more challenging, conflicted," Pensions & Investments, Mar. 22, 1999.

"White & Case in Innovative Forest Securitization," New release from White & Case, www.whitecase.com/news/detail.aspx?news=640&print=true, Dec. 13, 2002.

* cited by examiner

SECURITIZATION STRUCTURE

BACKGROUND

In a common securitization scheme, an issuer issues securities backed by the cash flow and other economic benefits generated by a pool of assets (usually loans or other debt instruments). Typically, the issuer is a special purpose entity or some other type of entity which is bankruptcy remote from the sponsor, or originator, of the securitization. The sponsor sells its interest in receivables to the issuer in exchange for a payment from the issuer. This allows the sponsor to make adjustments to its balance sheet, tranche the debt to reach different investment groups, or originate or service more receivables. After acquiring the sponsor's interest in receivables from the sponsor, the issuer issues securities backed by those same receivables.

Securitizations in the timber industry are known, but are rare. In such past timberland securitizations, the issued securities were backed by the sale of timber products from the timberlands. Some of these securitizations have not performed well. The securities in the past timberland securitizations were not highly rated by the rating agencies (i.e., never higher than an A rating). Accordingly, there exists a need for a timberlands securitization structure that allows the securities to be highly rated and that also provides other attractive features to potential investors.

SUMMARY

In one general aspect, the present invention is directed to a securitization structure that is particularly useful for the securitization of mortgage payments on timberlands. In the securitization structure, one or more borrowers obtain a mortgage loan on a reference property (e.g., timberlands). For example, the borrowers may use the mortgage loan to finance the purchase of the timberlands. The mortgage loan is sold to an issuer that issues securities to investors, where the proceeds from the offering are used to purchase the mortgage loan.

The securities may be fixed-income debt instruments, such as pass-through certificates. In such an embodiment, the pass-though rate payments on the certificates may be funded by payments to the issuer by the borrowers on the mortgage loan. The certificates have a legal maturity and an expected maturity that is shorter than the legal maturity. Preferably, the expected maturity is significantly shorter than the legal maturity, such as at least ten or more years shorter than the legal maturity. For example, if the legal maturity is thirty years, the expected maturity may be ten years. The payments owed by the borrowers on the mortgage loan may be interest only until the expected maturity. The borrowers also have a revolving credit facility with a liquidity provider, pursuant to which the liquidity provider commits to make advances to the borrowers from time to time as necessary in order for the borrowers to make timely payments of interest on the mortgage.

In various implementations, it is expected that the mortgage and the certificates are to be refinanced before the end of the expected maturity. If not, all cash flows of the borrowers may be used to amortize the debt in a "full turbo" after the expected repayment date ("ERD") if the mortgage and the certificates have not been refinanced. The certificates may also pay contingent additional interest if the certificates are not refinanced by the ERD.

In other general aspects, the present invention is directed to issuing, buying, and/or selling the certificates. Embodiments of the present invention are also directed to underwriting the issuance of the certificates.

FIGURES

Various embodiments of the present invention are described herein by way of example in conjunction with the following figures wherein.

DETAILED DESCRIPTION

Figure 1:
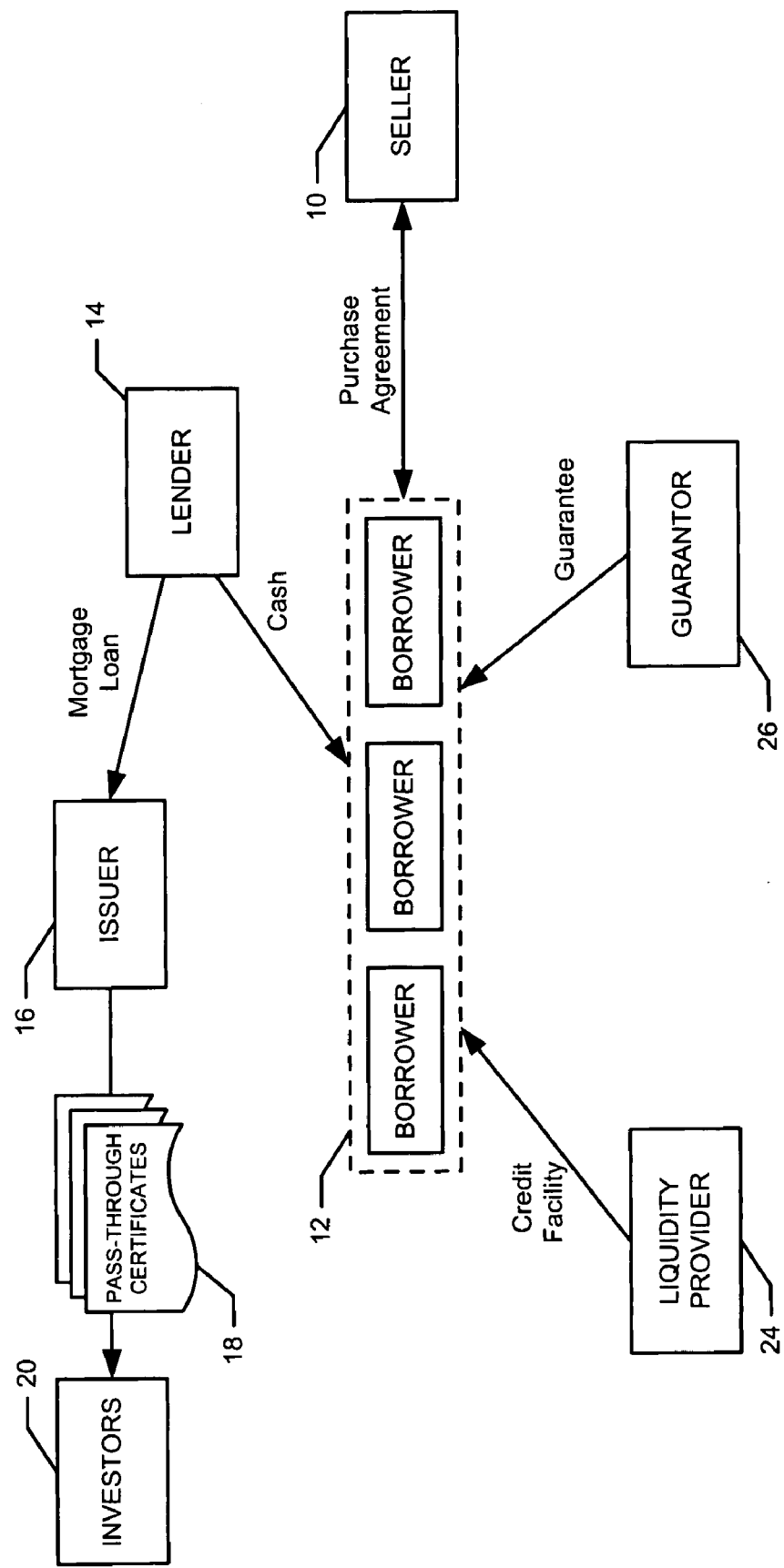
FIGS. 1 and 2 are diagrams illustrating a securitization structure according to various embodiments of the present invention.
Figure 2:
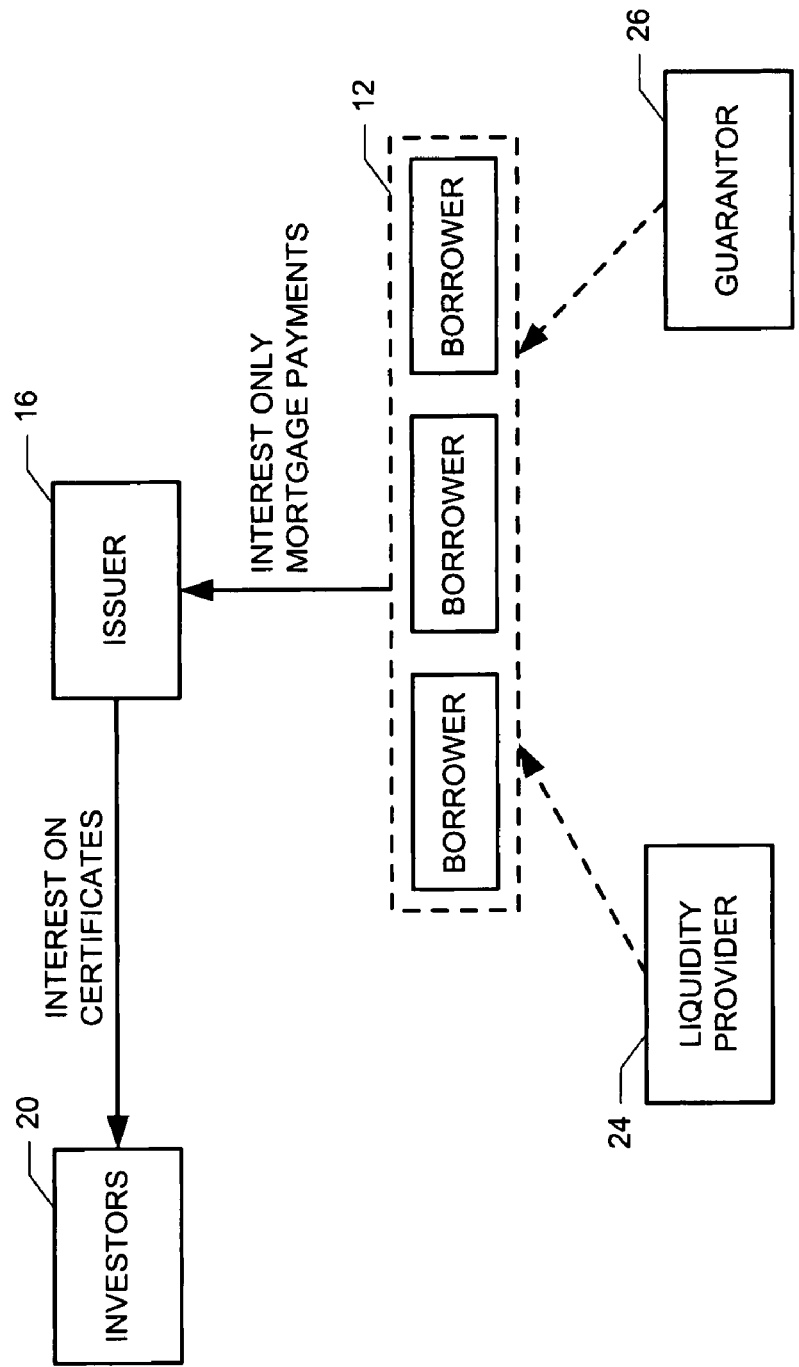

FIGS. 1 and 2 illustrate a securitization structure according to various embodiments of the present invention. In the illustrated embodiment, one or more borrowers 12 obtain a mortgage loan on a reference property. Preferably, the reference property comprises timberlands. For example, a seller 10 may sell the timberlands property to the borrowers 12 pursuant to a purchase agreement, whereby the borrowers 12 finance the purchase, at least in part, through a mortgage loan obtained from a lender 14. The lender 14 may then sell the mortgage loan to an issuer 16, which pays for the mortgage loan with proceeds from the issuance of securities 18 to investors 20. The borrowers 12, the lender 14, and the issuer 16 may all be separate special purpose entities (SPEs).

The mortgage loan may be a fixed-rate, monthly pay, non-recourse mortgage loan entered into on the closing date of the transaction. The mortgage loan may have several components, each component bearing a different interest rate. Each component of the mortgage loan may be evidenced by a separate promissory note executed by the borrowers 12 on a joint and several basis (when there is more than one borrower 12). The promissory notes collectively may be secured by (i) mortgage and deeds of the issuer 16 creating first priority liens on the interest in the mortgaged property held by the borrowers 12 and (ii) a security interest in other related collateral.

The securities 18 may also be issued on or about the closing date. The lender 14 may assign the mortgage loan to the issuer 16 concurrently with the issuance of the securities 18.

In various embodiments, the securities 18 may be debt instruments (e.g., bonds) that pay either a fixed or floating interest rate. In addition, the issuer 16 may issue numerous classes of the securities 18, each class having a different subordination level. The least subordinate (most superior) class may pay the lowest interest rate and the most subordinate (least superior) class may pay the highest rate. According to various embodiments, by virtue of aspects of the structure described herein, one or more of the more senior classes of the securities 18 may have a rating of A or higher.

The number of classes of securities 18 issued by the issuer 16 preferably corresponds to the number of components in the mortgage loan, such that each class of securities has a corresponding component of the mortgage loan. Each class of the securities 18 may also pay a pass-through rate equal to the interest rate on its corresponding component of the mortgage loan plus trustee and servicing fees. In that sense, the securities 18 may be considered pass-through certificates. Distributions to the investors 20 on the securities 18 may be made, to the extent available, on period distribution dates.

As shown in FIG. 2, after issuance of the securities 18 and closing of the mortgage, the borrowers 12 may make their respective payments on the mortgage loan to the issuer 16, which may use the proceeds to make the necessary payments on the securities 18. The pass-through certificates 18 may have a legal term and an expected term that is less than the legal term. Preferably, the expected term is significantly shorter (or less than) the legal maturity, such as ten or more years shorter. For example, the legal term of the securities 18 may be thirty years and the expected term may be ten years. The mortgage payments by the borrowers 12 may be interest only up to the end of the expected term. The last day of the expected term is referred to herein as the "expected repayment date" or "ERD."

There may be an expectation that the mortgage loan will be refinanced by or before the end of the expected term. If they are not, the borrowers 12 may be required to make periodic (e.g., monthly) principal payments in respect of the mortgage loan (in addition to the interest payments that are due). According to various embodiments, the principal payments that are due after the expected term may be equal to the greater of (i) all excess cash flow of the borrowers or (ii) an amount sufficient to amortize the loan based on an amortization schedule for the number of years remaining in the legal term of the securities 18 (for example, if the legal term is thirty years and the expected term is ten years, the amortization schedule may be a 20-year schedule).

Further, according to various embodiments, if the securities 18 are not paid off by the end of the expected term, the investors 20 are entitled to receive contingent additional interest after the end of the expected term on the securities 18. The contingent additional interest may be, for example, an additional 5% or more in interest for each class of securities 18. For this reason, there is an incentive to refinance the mortgage and pay off the securities 18 before the end of the expected term.

As mentioned above, the reference property for the mortgage loan preferably comprises timberlands. The borrowers 12 may receive payments due to the harvest of timber on the timberlands and such payments may be used to cover the operating costs of the timberlands and the borrowers' payment obligations to the issuer 16 under the mortgage loan. Because timber prices are subject to market fluctuations, the borrowers 12 may enter into a revolving credit facility with a liquidity provider 24. The credit facility is preferably entered into on or prior to the closing date for the transaction and requires the liquidity provider 24 to commit to make advances to the borrowers 12 from time to time as necessary during the effective term of the credit facility in order for the borrowers 12 to make timely payments of interest under the mortgage loan. The liquidity provider's commitment (or "commitment amount") is preferably equal to the amount of interest expected to be payable on the mortgage loan over a defined period of time, such as six months. The liquidity provider 24 preferably has a high credit rating (e.g., a credit rating indicating stability). Also, under the credit facility the liquidity provider 24 may be paid a floating rate (e.g., LIBOR+x %) for outstanding advances.

According to one embodiment, the term of the credit facility may be one year, automatically extendable thereafter for one-year periods, except upon notice from the liquidity provider 24. If the liquidity provider 24 does not agree to extend, the borrower 12 will be required to either (i) enter into a replacement credit facility on substantially the same terms or (ii) request an advance (a "non-extension advance") from the liquidity provider 24 prior to the expiration of the existing credit facility in an amount equal to the excess of (A) the commitment amount under the existing credit facility over (B) the aggregate amount of each interest advance by the liquidity provider 24 then outstanding. The proceeds from any non-extension advance may be deposited in an account and subsequently withdrawn by the borrowers 12 for the purpose of paying interest on the mortgage loan as needed.

A guarantor 26, which may be the parent of the borrowers 12, may guarantee repayment of the mortgage loan by the borrowers 12. The guarantor 26 may be a special purpose entity (SPE) established for the sole purpose of holding the direct and indirect equity interests of the borrowers 12. The guarantor 26 may pledge those interests as security for the guaranty. The guaranty may provide an alternative to foreclosure of the mortgage loan, not credit support. Accordingly, the guarantor 26 preferably owns no material assets other than the equity interests in the borrowers 12. Upon the occurrence of a default on the mortgage loan, the issuer 16 may be entitled to exercise with respect to those equity interests all rights and remedies available to a secured party under the Uniform Commercial Code, including foreclosing on such equity interests.

In the case where the mortgaged property is timberlands, a manager (not shown) may manage the timberlands for the borrowers 12. The manager may be, for example, an affiliate of the borrowers 12. The manager's duties may include (i) marketing the timber and administering the sales thereof, including negotiation of price for timber with buyers thereof, (ii) developing and implementing management and harvesting plans for the timberlands, including schedules for harvesting, planting and fertilization, etc.

The borrowers 12 preferably establish one or more deposit accounts into which proceeds from the sale of timber and other timber-related products from the mortgaged timberlands are to be deposited. The deposit account(s) may be under the control of the issuer 16.

Figure 3:
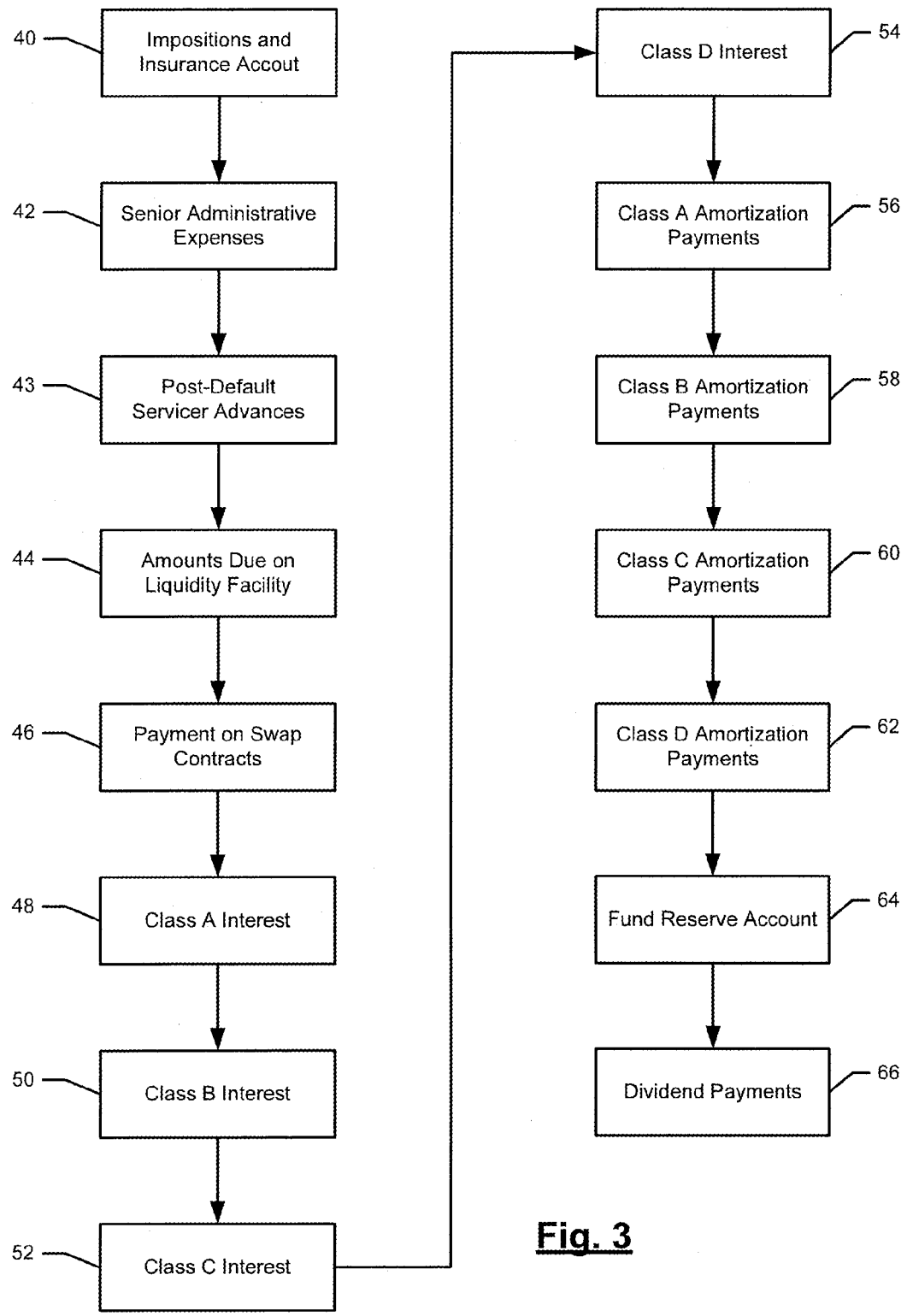
FIG. 3 is a diagram illustrating a payment priority waterfall according to various embodiments of the present invention.

FIG. 3 is a diagram of waterfall priority payment structure for funds received by the issuer. First, at step 40, an impositions and insurance account may be funded. Next, at step 42, senior administrative expenses may be paid, such as expenses to trustees, accountants, rating agencies, paying agents, cash manager fees, etc. Next, at step 43, post-default advance payments are made to a servicer (not shown) of the loan. In the event of a default, the servicer would be required to make advances that are reasonably likely to be recoverable (e.g., likely to be paid). Next, at step 44, amounts due on the liquidity facility may be paid. Next, at step 46, payments on swap contracts, if any, are paid.

Next, the interest on the securities 18 may be paid in order of their seniority. In this example, there are four classes of securities 18: Class A, Class B, Class C and Class D. Thus, at step 48, the interest on the Class A securities is paid. At step 50, the interest on the Class B securities is paid. At step 52, the interest on the Class C securities is paid. And at step 54, the interest on the Class D securities is paid. Then, assuming for the sake of the illustrated example that the mortgage was not refinanced by the ERD, the amortization payments on the classes of the securities 18 may be paid in order of the seniority at steps 56-62.

Then, at step 64, assuming there are still remaining funds, a reserve account may be funded up to a predetermined level based on performance, such as debt service coverage ratio and volume of harvest. Next, at step 66, if there are still remaining funds, excess cash flow may be used by the borrowers 12, including for dividend payments to the equity owners of the borrowers 12.

The borrowers 12 may also establish a cash trap reserve account, managed by the issuer 16, to reserve excess cash flow while any cash trap condition is continuing. In various embodiments, during the continuation of a cash trap condition and until the expected repayment date, all excess cash flow of the borrowers 12 may be deposited in the cash trap reserve account. On each distribution date, for so long as the cash trap condition continues to exist, the funds on deposit in the cash trap reserve account may be applied pursuant to the defined waterfall priority, such as described in connection with FIG. 3. The cash trap is not needed after the ERD, In embodiments where the securitization structure is used to securitize mortgage payments on timberlands, the manager of the mortgaged timberlands may prepare a harvest plan (the "Base Harvest Plan") for the timberlands. The Base Harvest Plan preferably sets forth a base harvest, which is, with respect to any time period, the total volume of timber to be harvested from the timberlands during the period. In that connection, a cash trap condition may be considered to exist as of the end of any calendar quarter and prior to the expected repayment date if any of the following conditions has occurred and is continuing:

(1) the debt service coverage ratio for any calendar quarter ending after closing is 1.10× or less (or some other cash trap debt service coverage ratio threshold), and such cash trap condition will continue to exist until the debt service coverage ratio exceeds the cash trap debt service coverage ratio threshold for two consecutive calendar quarters;

(2) the most recently calculated LTV ratio exceeds some threshold cash trap LTV threshold (e.g., 90%), where LTV ratio means, as of any determination date, the adjusted balance of the mortgage loan divided by the most recently obtained appraised value;

(3) an over-harvest condition exists; or (4) an under-harvest condition exists.

According to various embodiments, the over-harvest condition may be considered to exist when:

(i) the total volume of timber harvested from the mortgaged timberlands during a certain defined time period (e.g., the most recently ended calendar year) exceeds the base harvest (as set forth in the Base Harvest Plan) for the defined time period by more than a certain, predefined threshold percentage (e.g., 15%);

(ii) the total volume of timber harvested from the timberlands during a defined time period (e.g., the most recently completed five calendar years) exceeds the base harvest for that time period by more than a certain, predefined threshold percentage (e.g., 10%); or (iii) the total volume of timber harvested from the timberlands from the closing date through the end of the most recent calendar year (or some other time period) exceeds the base harvest for such period by more than predefined threshold percentages (e.g., 10% for the first three years after the closing date, 9% for the next three years after the closing date, and 8% thereafter).

In various embodiments, none of the above-listed conditions will constitute an over-harvest condition if the manager reasonably determines, based on the most recent harvest plan developed, that the total volume of timber expected to be harvested from the timberlands during each subsequent calendar year covered by the Base Harvest Plan will be at least 100% of the base harvest for each such year.

An under-harvest condition may be considered to exist when:

(i) either (A) the total volume of timber harvested from the timberlands during the most recently completed calendar year (or some other time period) was less than some threshold minimum percentage (e.g., 85%) of the base harvest for that time period or (B) the total volume of timber harvested from the timberlands during the most recently completed five calendar years (e.g., or some other time period) was less than some threshold minimum percentage (e.g., 90%) of the base harvest for that time period; and (ii) the debt service coverage ratio (DSCR) for the most recently completed calendar year (or some other time period) is at or below some threshold ratio (e.g., 1.10× or less).

The DSCR as of any determination date may be (a) the sum of the net cash flow for the timberlands plus the amount of any supplemental deposits made during the most recently completed twelve calendar month period, divided by (b) the amount of interest that the borrowers 12 will be required to pay over the succeeding twelve months on the principal amount of the mortgage loan.

The mortgage loan preferably sets forth conditions of default for the borrowers 12 pertaining to the mortgage loan. The default conditions may include, for example, failure of the borrowers 12 to pay any scheduled payment amount when due, failure of the borrowers 12 to pay any other amounts from time to time owing under the mortgage loan within ten days after written notice to the borrowers 12, failure to comply with financial reporting requirements, any breach or default of certain covenants of the mortgage loan, etc. The mortgage loan also preferably sets forth remedies for such default conditions, including acceleration, foreclosure against all or part of the mortgaged property, the right to seek a deficiency judgment, exercise of remedies under the guaranty, etc.

According to various embodiments, the present invention is directed to issuing the securities 18. Also, other embodiments are directed to selling and/or buying the securities 18, including as part of the initial offering by the issuer 16 or in the after-market. Also, various embodiments of the present invention are directed to underwriting (by one or more underwriters) the issuance of the securities 18.

Figure 4:
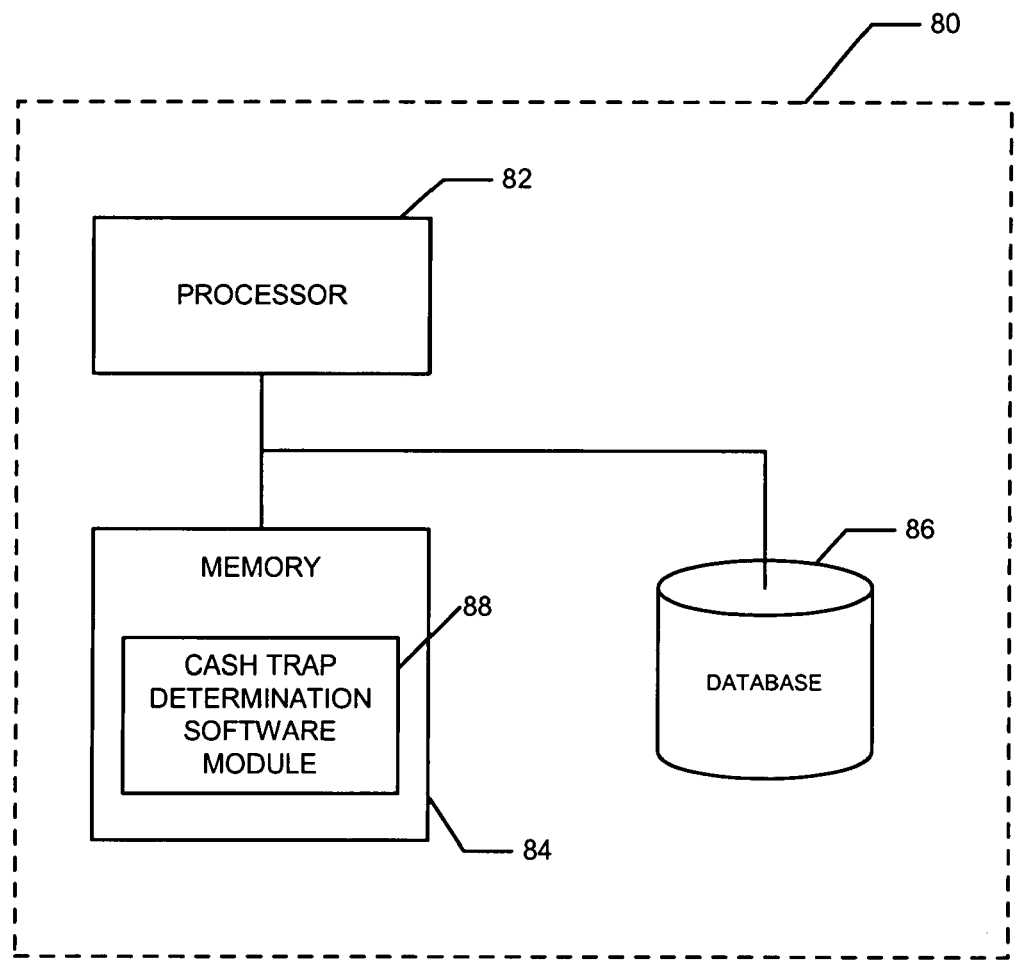
FIG. 4 is a diagram of a computer system according to various embodiments of the present invention.

FIG. 4 is a diagram of a computer system 80 according to various embodiments of the present invention. The computer system 80 may comprise a processor 82, a memory 84, and a database 86. The memory 84 may store computer instructions for execution by the processor 82 and may comprise a cash trap determination software module 88. The cash trap determination software module 88 may comprise instructions, which, when executed by the processor 82, cause the processor 82 to determine whether a cash trap condition exists based on data stored in the database 86. In that connection, the database 86 may store data regarding the Base Harvest Plan as well as data regarding the actual amount (e.g., volume) of timber harvested from the timberlands over various pertinent time periods. The database 86 may also store data regarding the interest payments due by the borrowers 12 under the mortgage loan, the net cash flow of the borrowers 12, the adjusted balance of the mortgage loan, and the appraised value of the mortgaged timberlands. In that way, the processor 82 can determine whether a cash trap condition exists. The DSCR and LTV ratios computed by the computer system 80 may be stored in the memory 84 or some other storage (e.g., a register of the processor 82) and/or transmitted to another computer system via a network.

The computer system 80 may be implemented as one or a number of networked computing devices, such as servers, personal computers, mainframes, workstations, laptops, etc. The memory 84 may be any computer readable medium, including RAM or ROM.

While various embodiments have been described herein, it should be apparent that various modifications, alterations and adaptations to those embodiments may occur to persons skilled in the art with attainment of at least some of the advantages. The disclosed embodiments are therefore intended to include all such modifications, alterations and adaptations without departing from the scope of the embodiments as set forth herein.

What is claimed is:

1. A computer-implemented method relating to pass-through certificates, the method comprising:
   determining, by a computer system, following issuance of the pass-through certificates by an issuer, whether a cash trap condition exists with respect to the pass-through certificates, wherein:
      pass-though rate payments on the certificates are funded by payments to the issuer by one or more borrowers on a mortgage loan for a reference property;
      the reference property comprises harvestable timberlands; and
      the mortgage loan requires that during a cash trap condition, all excess cash flow of the one or more borrowers is to be deposited in a cash trap reserve account; and
   wherein determining whether the cash trap condition exists comprises:
      determining, by the computer system, whether an under-harvest condition exists for the reference property and whether an over-harvest condition exists for the reference property, wherein the cash trap condition exists when any one of a plurality of disjunctive conditions exists, wherein the disjunctive conditions comprise (i) an over-harvest condition for the reference property and (ii) an under-harvest condition for the reference property,
   wherein determining whether an under-harvest condition exists comprises determining, by the computer system, whether both (a) a total volume of harvested timber over one or more time periods meets a corresponding under-harvest threshold for the reference property for the one or more time periods and (b) a debt service coverage ratio (DSCR) for the certificates is at or below a DSCR under-harvest threshold value, and
   wherein the computer system is in communication with a database that stores data about timber harvested from the reference property, and wherein the computer system comprises a cash-trap determination module for determining whether the cash trap condition exists based on the data in the database.

2. The method of claim 1, wherein the certificates are fixed-income securities.

3. The method of claim 2, wherein the pass-through certificates comprise two or more classes of pass-through certificates, wherein a first class is subordinate to a second class and pays a higher pass-through rate than the second class.

4. The method of claim 1, wherein determining whether a cash trap condition exists, further comprises:
   determining, by the computer system, whether the under-harvest threshold is met by determining
      (i) whether a total volume of timber harvested from the harvestable timberlands during a most recent calendar year is less than a minimum threshold percentage of a base harvest for the most recent calendar year; or (ii) whether a total volume of timber harvested from the harvestable timberlands during five most recent calendar years is less than a minimum five year threshold percentage of a base harvest for the five most recent calendar years.

5. The method of claim 1, wherein
   determining whether the over-harvest condition exists comprises by determining, by the computer system:
      (i) whether the total volume of timber harvested from the harvestable timberlands during the most recent calendar year exceeds the base harvest by a maximum threshold percentage for the most recent calendar year; (ii) whether the total volume of timber harvested from the harvestable timberlands during five most recent calendar years exceeds a maximum five year threshold percentage of the base harvest for the five most recent calendar years, or (iii) whether a total volume of timber harvested from the harvestable timberlands from a closing date through the end of the most recent calendar year exceeds the base harvest for a time period from the closing date through the end of the most recent calendar year by more than closing date thresholds.

6. The method of claim 1, wherein determining whether a cash trap condition exists, further comprises determining, by the computer system, whether the DSCR is equal to or less than a DSCR cash-trap-condition threshold, wherein the plurality of disjunctive conditions used to determine whether a cash trap condition exists comprises whether the DSCR is equal to or less than the DSCR cash-trap-condition threshold.

7. The method of claim 1, wherein determining whether a cash trap condition exists, further comprises determining, by the computer system, whether a LTV ratio exceeds a LTV threshold, wherein the LTV ratio is an adjusted balance of the mortgage loan divided by a most recently appraised value, wherein the plurality of disjunctive conditions used to determine whether a cash trap condition exists comprises whether the LTV ration exceeds the LTV threshold.

8. The method of claim 1, wherein determining whether the cash trap condition exists comprises determining, by the computer system, on an ongoing basis after issuance of the pass-through certificates whether the cash trap condition exists.

9. The method of claim 1, wherein the certificates have a legal maturity and an expected maturity that is before the legal maturity.

10. The method of claim 9, wherein the payments owed by the borrowers on the mortgage loan are interest only until the expected maturity.

11. The method of claim 10, wherein the one or more borrowers have a revolving credit facility with a liquidity provider, pursuant to which the liquidity provider commits to make advances to the one or more borrowers from time to time as necessary in order for the one or more borrowers to make timely payments of interest on the mortgage loan.

12. The method of claim 11, wherein the liquidity provider has a commitment amount under the credit facility that is equal to a specified amount of debt service payments on the mortgage loan.

13. The method of claim 11, wherein if the mortgage loan is not refinanced by the end of the expected maturity, the one or more borrowers are required to make principal payments on the mortgage loan and holders of the pass-through certificates are entitled to receive contingent additional interest on the pass-through certificates.

14. The method of claim 13, wherein the contingent additional interest is greater than or equal to 5%.

15. The method of claim 11, wherein the expected maturity is ten years or more before the legal maturity.

16. The method of claim 11, wherein:
   the mortgage loan has a plurality of components; and
   each component is evidenced by a promissory note executed by the one or more borrowers.

* * * * *